United States Patent [19]

Heinrich et al.

[11] 4,172,284

[45] Oct. 23, 1979

[54] PRIORITY INTERRUPT APPARATUS EMPLOYING A PLURAL STAGE SHIFT REGISTER HAVING SEPARATE INTERRUPT MECHANISMS COUPLED TO THE DIFFERENT STAGES THEREOF FOR SEGREGATING INTERRUPT REQUESTS ACCORDING TO PRIORITY LEVELS

[75] Inventors: Hans J. Heinrich, Kirchheim; Dieter Schütt, Bonn, both of Fed. Rep. of Germany

[73] Assignee: International Business Machines Corporation, Armonk, N.Y.

[21] Appl. No.: 861,056

[22] Filed: Dec. 15, 1977

[30] Foreign Application Priority Data

Dec. 30, 1976 [DE] Fed. Rep. of Germany ....... 2659662

[51] Int. Cl.² .............................................. G06F 9/18
[52] U.S. Cl. .................................................... 364/200
[58] Field of Search ... 364/200 MS File, 900 MS File; 340/147 LP

[56] References Cited

U.S. PATENT DOCUMENTS

| | | | |
|---|---|---|---|
| 3,226,694 | 12/1965 | Wise | 364/200 |
| 3,353,160 | 11/1967 | Lindquist | 364/200 X |
| 3,599,162 | 8/1971 | Byrns et al. | 364/200 |
| 3,611,305 | 10/1971 | Greenspan et al. | 364/200 |
| 3,636,519 | 1/1972 | Heath | 364/900 |
| 3,781,815 | 12/1973 | Boudreau et al. | 364/900 |
| 4,020,471 | 4/1977 | Woods et al. | 364/200 |
| 4,115,855 | 9/1978 | Chiba | 364/200 |

*Primary Examiner*—Melvin B. Chapnick
*Attorney, Agent, or Firm*—Richard E. Bee

[57] ABSTRACT

A priority level controlled unit for use in a microprogrammed digital data processing system for handling interrupt requests from interrupt sources having different interrupt priority levels. Each interrupt request is a plural-bit request having a priority level field and an interrupt source identifying field. A plural stage shift register is provided, each stage having enough bit positions to hold a single interrupt request. Successive shift register stages are assigned to successively lower priority levels. The interrupt requests are supplied one at a time to the highest priority level stage in the shift register. A separate comparator mechanism, coupled to each shift register stage, compares the priority level field of an interrupt request residing therein with the priority level value assigned to such stage for indicating priority level matches and mismatches. If a priority level mismatch is indicated for any given stage, then the interrupt request therein is transferred to the next shift register stage. A separate first-in-first-out storage stack is associated with each stage. If a priority level match is indicated for any given stage, then the interrupt source identifying field of the request producing the match is stored into the storage stack for such stage. A separate instruction address mechanism, coupled to the output of each storage stack, responds to the currently output interrupt source identifying field for developing an appropriate interrupt routine address pointer. This pointer is transferred to the data processor control store for initiating execution of the appropriate microcode interrupt routine provided that a valid interrupt request is not pending in the storage stack for a higher priority level. If any higher priority level requests are pending, then the transfer of a lower level address pointer to the control store is blocked until such higher priority level requests have been serviced.

10 Claims, 8 Drawing Figures

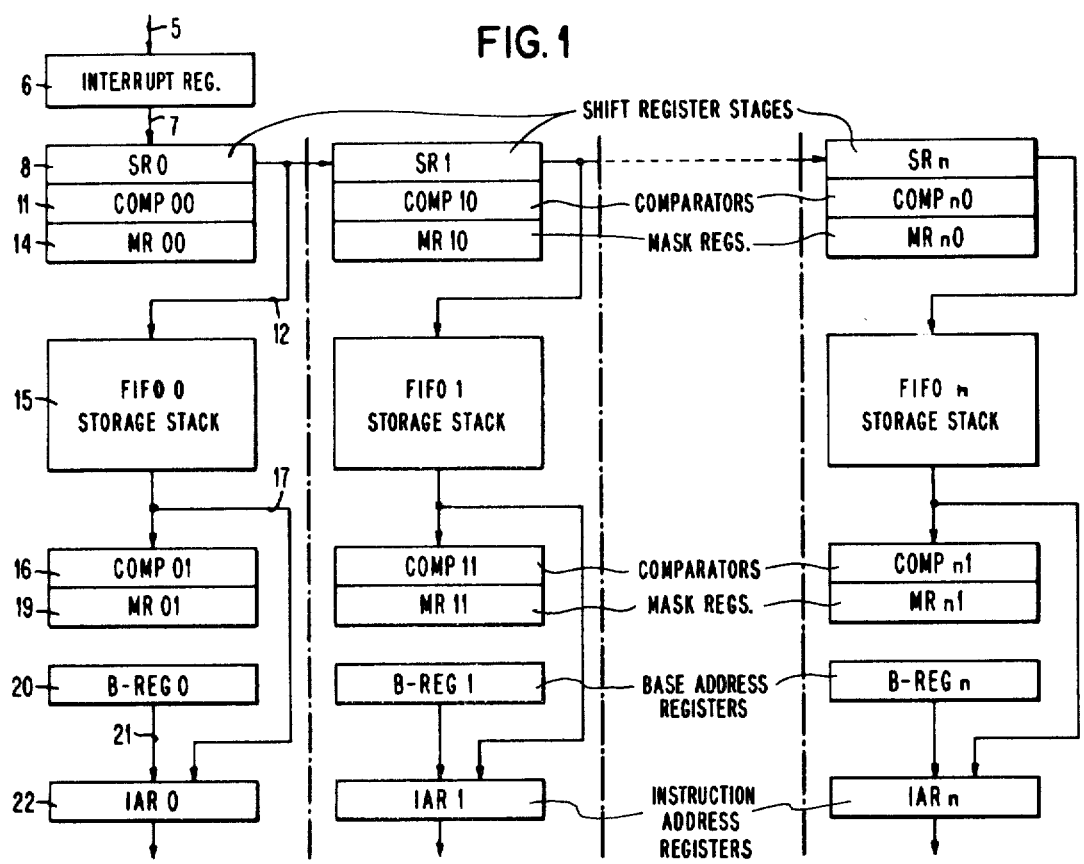
FIG. 1
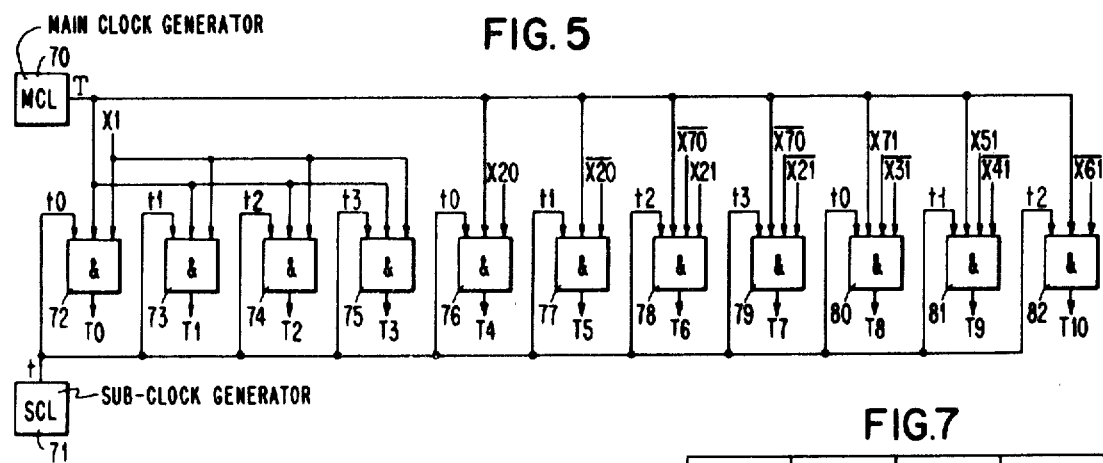
FIG. 5
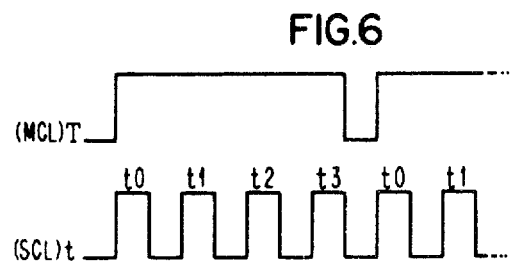
FIG. 6
FIG. 7
| | STATUS | CODE | REF |
|---|---|---|---|
| INT-REG | E/NE | $X1/\overline{X1}$ | BIT 6 |
| SR | E/NE | $X2/\overline{X2}$ | BIT 6 |
| FIFO | F/NF | $X3/\overline{X3}$ | BIT 6* |
| FIFO | E/NE | $X4/\overline{X4}$ | BIT 6** |
| IAR | E/NE | $X5/\overline{X5}$ | MSB-BA |
| LVL | B/NB | $X6/\overline{X6}$ | |
| COMP | EQ/NEQ | $X7/\overline{X7}$ | BITS 0,1,6 |

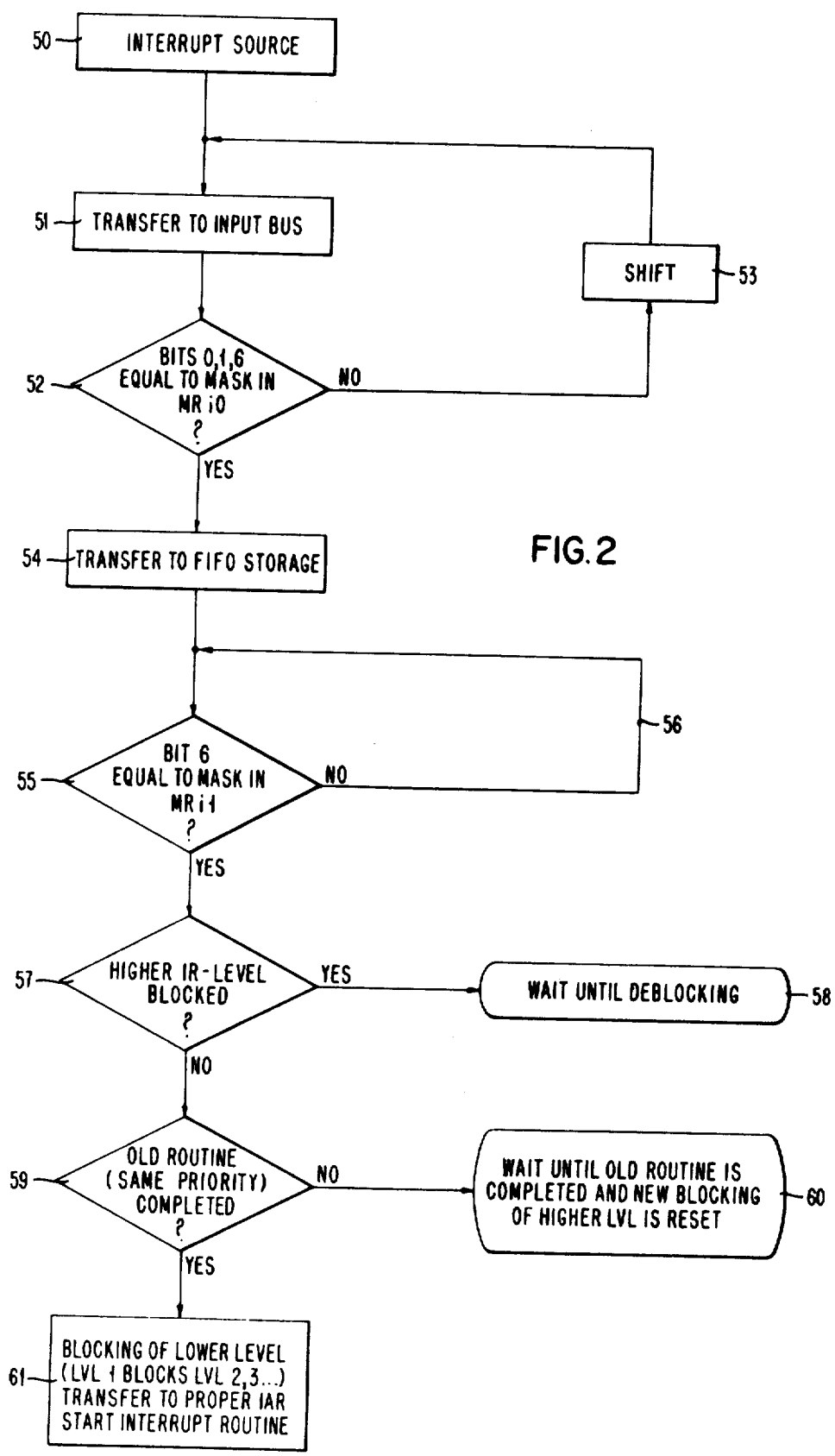

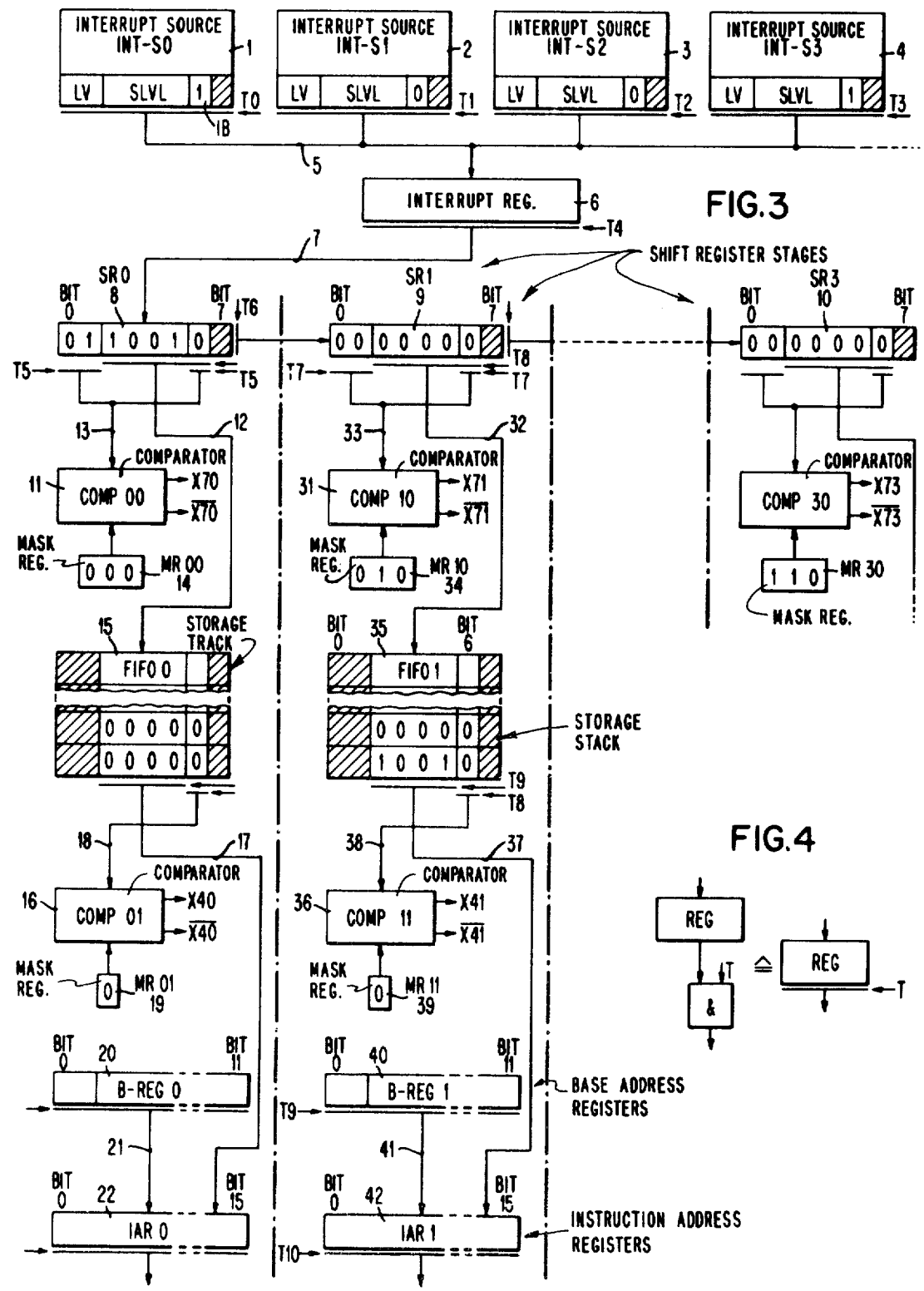

PRIORITY INTERRUPT APPARATUS EMPLOYING A PLURAL STAGE SHIFT REGISTER HAVING SEPARATE INTERRUPT MECHANISMS COUPLED TO THE DIFFERENT STAGES THEREOF FOR SEGREGATING INTERRUPT REQUESTS ACCORDING TO PRIORITY LEVELS

BACKGROUND OF THE INVENTION

This invention relates to priority interrupt apparatus and to methods for handling priority interrupt requests in a digital data processing system or digital computer system.

The rapid handling of interrupt requests from different interrupt sources plays an important part in digital data processing systems, particularly in those systems employed in real time applications. In a process control application, for example, a plurality of interrupt sources, such as sensors for temperature, pressure, moisture, flow rate and the like, necessitate interruptions or changes of the control process or operating sequence and it is essential that interrupt requests from such sources are handled very quickly.

Some previous solutions for handling interrupt requests have been based on very expensive data processing hardware mechanisms with complicated circuit structures which, although reacting at the required speed, are elaborate and prone to defects because of their complicated structure.

An alternative solution frequently adopted in the past involves the use of various software programs and structures stored in the data processing system for providing the desired priority level switching. Although this software approach is less elaborate and somewhat more reliable than the complicated hardware approach, it is, nevertheless, too slow for a goodly number of applications.

SUMMARY OF THE INVENTION

It is an object of the invention, therefore, to provide new and improved priority interrupt apparatus and methods which are particularly useful in medium and small size data processing systems requiring a very quick reaction to interrupt requests, which apparatus and methods, on the one hand, permit a very quick handling of interrupt requests and which, on the other hand, are more acceptable from a cost and a reliability standpoint.

In accordance with the invention, there is provided a priority interrupt unit for use in a data processing system having different stored interrupt routines for different interrupt sources. This priority interrupt unit includes input circuitry for successively supplying plural-bit interrupt requests, each having a priority level field and an interrupt source identifying field. This priority interrupt unit also includes a plural stage shift register, each stage having enough bit positions to hold at least the priority level and source identifying fields of a single interrupt request. Successive stages of such shift register are assigned to successively lower priority levels and the highest priority level stage is coupled to the input circuitry for initially receiving each incoming interrupt request. The priority interrupt unit further includes a plurality of interrupt mechanisms individually associated with different ones of the shift register stages for developing appropriate interrupt routine address pointers. The priority interrupt unit additionally includes transfer circuitry for transferring an interrupt request in any given shift register stage to the next shift register stage if the request priority level field does not match the priority level assigned to the given shift register stage and for transferring the interrupt source identifying field of such interrupt request to the interrupt mechanism associated with the given shift register stage if the request priority level field does match the priority level assigned to the given stage.

This invention is essentially a simplified hardware oriented solution to the problem. As such, the priority level switching of previous software oriented solutions is eliminated. As a consequence, the reaction time to interrupt requests is considerably shortened and the operational reliability is substantially increased by eliminating repeated switching operations and table lookup procedures.

For a better understanding of the present invention, together with other and further objects and features thereof, reference is made to the following description taken in connection with the accompanying drawings, the scope of the invention being pointed out in the appended claims.

BRIEF DESCRIPTION OF THE DRAWINGS

Referring to the drawings:

FIG. 1 is a general block diagram of an improved priority interrupt unit constructed in accordance with the present invention;

FIG. 2 is a flow chart used in explaining the operation of the interrupt unit of FIG. 1;

FIG. 3 is a more detailed block diagram of a particular implementation of the interrupt unit of FIG. 1;

FIG. 4 explains the graphic symbols used in FIG. 3 to represent output gate circuits associated with various registers and other elements shown in FIG. 3;

FIG. 5 shows the construction of a representative portion of a gate control signal generator for generating the gate control signals T0, T1, T2, etc., needed by the FIG. 3 unit for a typical operating sequence;

FIG. 6 is a timing diagram showing typical clock pulses generated by a main clock and a sub-clock in the FIG. 5 gate control signal generator;

FIG. 7 is a table showing the significance of various control signals developed by various ones of the elements in the FIG. 3 interrupt unit.

DESCRIPTION OF THE PREFERRED EMBODIMENT

Figure 8:
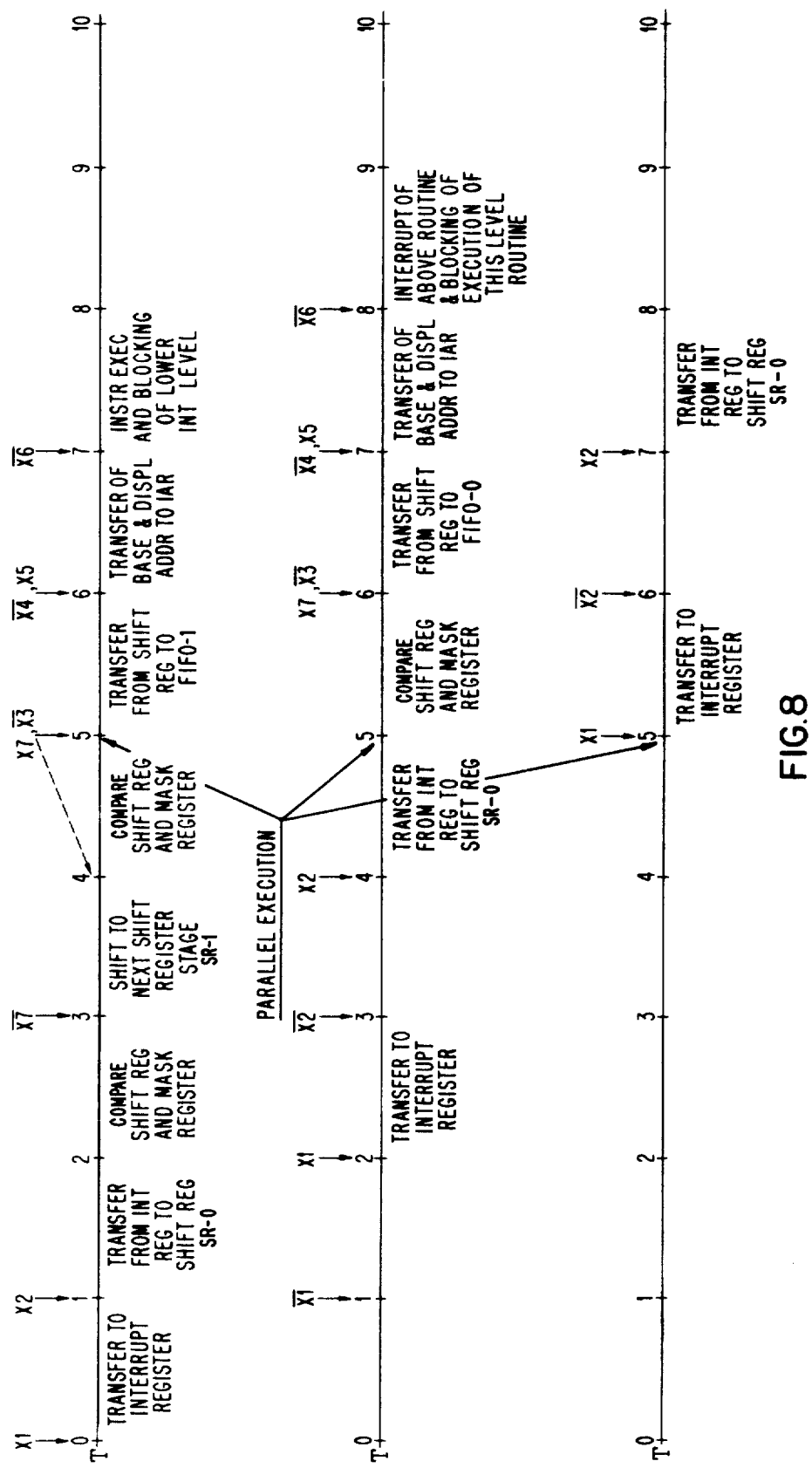
FIG. 8 is a timing diagram showing a typical sequence of operations in the FIG. 3 interrupt unit and showing, in particular, the parallel execution or handling of three different interrupt requests in the FIG. 3 interrupt unit.

FIG. 1 shows a general block diagram of a priority level controlled unit constructed in accordance with the present invention for use in conjunction with a digital data processor for enabling a very quick handling of interrupt requests from interrupt sources having different interrupt priority levels. For sake of example, it is assumed herein that the data processor is of the microprogrammed type having a control store having stored therein different microcode interrupt routines for executing interrupt requests from different interrupt sources. The interrupt requests received from the different interrupt sources are supplied one at a time by way of a multiconductor bus 5 to an interrupt register 6 which buffers each request for a short time. For sake of example herein, each interrupt request is assumed to have a width of one byte (8 data bits). Each such interrupt request or interrupt byte includes a priority level field (LV) and a priority sublevel field (SLVL). The priority level field contains a coded representation of the priority level of the request. The sublevel field contains a coded representation which identifies the particular source of the interrupt request. Each interrupt request may further include one or more interrupt control bits.

The priority interrupt unit of FIG. 1 also includes a plural stage shift register, the successive stages of which are identified as SR 0, SR1, ... SR n. Each of the shift register stages SR 0, SR 1, ... SR n has a width of one byte. Thus, each stage is capable of holding a complete 8-bit interrupt request. Successive shift register stages are assigned to successively lower interrupt priority levels. The highest priority level stage SR 0 (element 8) is coupled to the output of the interrupt register 6 by way of a byte wide bus 7 for initially receiving each incoming interrupt request.

The priority interrupt unit of FIG. 1 further includes a plurality of interrupt mechanisms individually associated with different ones of the shift register stages for developing appropriate control store interrupt routine address pointers. Each interrupt mechanism includes a storage stack for receiving and storing the interrupt source identifying fields of those interrupt requests having the same priority level as the shift register stage with which the interrupt mechanism is associated. Each such storage stack is operated in a first-in-first-out (FIFO) manner. These separate storage stacks are identified as FIFO 0, FIFO 1, ... FIFO n. The highest priority stack FIFO 0 (element 15) is associated with the highest priority shift register stage SR 0, the next lower priority stack FIFO 1 is associated with the next lower priority shift register stage SR 1, and so forth.

Each interrupt mechanism also includes interrupt routine address circuitry for receiving an interrupt source identifying field from its associated storage stack and developing in response thereto the appropriate interrupt routine address pointer. Each such interrupt routine address circuitry includes a plural-bit base address register (B-REG) and a plural-bit instruction address register (IAR). The instruction address register combines the base address received from the base address register with a source identifying priority sublevel field received from the associated storage stack (FIFO) to form a plural-bit instruction address pointer for the first instruction of an interrupt routine for executing the interrupt request of the corresponding interrupt source. Thus, the interrupt routine address circuitry associated with the highest priority level shift register stage SR 0 includes a base address register B-REG 0 (element 20) and an instruction address register IAR 0 (element 22), the interrupt routine address circuitry associated with the next lower priority level shift register stage SR 1 includes a base address register B-REG 1 and an instruction address register IAR 1, and so forth. IAR 0 is coupled to B-REG 0 by bus 21.

The multiple-conductor output busses from the instruction address registers IAR 0, IAR 1, ... IAR n run to the addressing mechanism for the control store (not shown) for the data processor with which the FIG. 1 interrupt unit is associated. The transfer of the interrupt routine address pointer residing in any given one of these instruction address registers to the control store address mechanism causes the data processor to commence execution of the microcode interrupt routine for the interrupt source identified by the interrupt source identifying field used to produce the address pointer. As will be seen, the interrupt unit of FIG. 1, is operated so that an address pointer in a lower priority level instruction address register (e.g., IAR 1) will not be transferred to the data processor control store if an unprocessed address pointer is pending in a higher priority level instruction address register (e.g., IAR 0). More accurately, the lower priority level address pointer will not be transferred to the control store so long as any unprocessed interrupt requests are pending in any of the higher priority level storage stacks.

Each of the storage stacks FIFO 0, FIFO 1, ... FIFO n is operated in a first-in-first-out manner whereby the first interrupt source identifying field stored into a given storage stack is the first interrupt source identifying field to be supplied to the associated instruction address register. In other words, the source identifying fields are read out of a storage stack in the same order in which they were written into the storage stack.

There is further associated with each shift register stage a comparator mechanism for comparing the priority level field of an interrupt request residing in such shift register stage with the priority level value assigned to such shift register stage for indicating the existence of priority level matches and mismatches. Each such comparator mechanism includes a comparator circuit (COMP) and a mask register (MR) containing a coded representation of the assigned interrupt priority level value, the comparator circuit being connected on the one hand to the priority level field portion of the associated shift register stage and on the other hand to the mask register. Thus, the comparator mechanism associated with the first shift register stage SR 0 includes a comparator circuit COMP 00 (element 11) and a mask register MR 00 (element 14), the comparator mechanism associated with the second shift register stage SR 1 includes a comparator circuit COMP 10 and a mask register MR 10, and so forth, for the remaining shift register stages.

If the level testing comparator mechanism associated with any given shift register stage indicates a priority level mismatch, then the interrupt request residing in such shift register stage is shifted or transferred as a whole to the next shift register stage. Thus, for example, if the comparator circuit COMP 00 indicates a priority level mismatch, then the interrupt request in shift register stage SR 0 is transferred to the next shift register stage SR 1.

If, on the other hand, the comparator circuit associated with any given shift register stage indicates a priority level match, then the interrupt source identifying sublevel field residing in such shift register stage is transferred to and stored into the storage stack associated with such shift register stage. For example, if the comparator circuit COMP 00 indicates a priority level match, then the interrupt source identifying field in the shift register SR 0 is transferred to and stored into the storage stack FIFO 0 via bus 12. In this match case, nothing is transferred to the next shift register stage SR 1. Also, a control bit in shift register stage SR 0 is reset to indicate that this shift register stage is free to receive the next interrupt request.

As seen from the foregoing, each incoming interrupt request is transferred from one shift register stage to the next until it reaches a shift register stage for which a priority level match is produced. When a match is made, the source identifying portion of the request is set into the storage stack for that shift register stage and the interrupt request is, in effect, deleted from the shift register chain. The interrupt request items (source identifying fields) in any given storage stack are used one at a time in a first-in-first-out manner to develop the control store address pointers for the interrupt sources which produced the requests. Finally, address pointers for lower priority level requests are not sent to the control store until all pending higher priority level requests have been processed. A point to note is that many different interrupt requests can be working their way through the interrupt unit of FIG. 1 at any given moment. In other words, the interrupt unit of FIG. 1 can handle interrupt requests for different priority levels in a partially parallel or overlapped manner with respect to time. Needless to say, this decreases the average reaction time for handling interrupt requests.

There is further associated with each of the storage stacks FIFO 0, FIFO 1 . . . FIFO n, a stack status test mechanism for testing the stack status for determining whether any unprocessed source identifying priority sublevel fields are pending therein and for enabling transfer of the oldest such priority sublevel field to the associated instruction address register. Each such test mechanism includes a comparator circuit (COMP) and a mask register (MR) containing a coded representation for the case where the storge stack is not empty, the comparator circuit being connected on the one hand to the output stage of the corresponding storage stack and, on the other hand, to its mask register. Thus, the stack status test mechanism for the first storage stack FIFO 0 includes a comparator circuit COMP 01 (element 16) and a mask register MR 01 (element 19), the test mechanism for the second storage stack FIFO 1 includes a comparator circuit COMP 11 and a mask register MR 11, and so forth.

Considering, for example, the stack status test mechanism for the first storage stack FIFO 0, if the comparator circuit COMP 01 generates a positive result, then this indicates the existence of a valid and unprocessed interrupt source identifying field at the output of FIFO 0. This positive result enables the output of FIFO 0 to be transferred via bus 17 to the instruction address register IAR 0, wherein it is catenated with the base address bits obtained from the base address register BREG 0 to form the appropriate address pointer. If, on the other hand, comparator circuit COMP 01 generates a negative result, this indicates that the storage stack FIFO 0 is empty, in which case nothing is transferred to the instruction address register IAR 0.

The flow chart of FIG. 2 shows very roughly the operation of the priority interrupt unit of FIG. 1. Process block 50 represents the presentation of an interrupt request by an interrupt source. Process block 51 represents the setting of the interrupt request into a shift register stage, in this case, the first stage SR 0, by way of its input bus. Decision block 52 represents the priority level test comparison made by the comparator circuit coupled to the shift register stage, in this case, by the comparator circuit COMP 00. For sake of example, it is assumed that bit positions zero and one in the shift register stage contain the priority level field. The bit 6 position referred to in block 52 is a marker bit or control bit obtained from the associated storage stack, in this case, FIFO 0. A binary value of 0 for this control bit 6 indicates that the associated storage stack is not full.

A positive compare result is obtained at decision block 52 if there is a priority level match (bits 0 and 1) and if the associated storage stack is not full (bit 6=0). In this case, descision block 52 is exited via the "yes" branch and the source identifying sublevel field portion of the interrupt request is transferred to the associated FIFO storage stack as indicated at block 54.

A negative compare result is obtained at decision block 52 if there is a mismatch of the priority level number of the interrupt request and the preassigned priority level number stored in the associated mask register, in this case, mask register MR 00. In this case, block 52 is exited via the "no" branch. As indicated by process block 53, this initiates a shift step which transfers the interrupt request to the next shift register stage, in this case, stage SR 1. In this case, process block 51 then represents the setting of the interrupt request into the second shift register stage SR 1. Decision block 52 then becomes the priority level comparison test performed by the second comparator circuit COMP 10. In this case, the second mask register MR 10 contains a priority level value which is one count lower than that in the first mask register MR 00.

In the event that decision block 52 obtains a priority level match but control bit 6 is indicating that the associated storage stack is temporarily full (bit 6=1), then the interrupt request is allowed to remain in its current shift register stage (e.g., SR 0) and no transfer is made to either the associated storage stack (e.g., FIFO 0) or to the next shift register stage (e.g., SR 1).

Assuming that the interrupt request has been transferred to the second shift register stage SR 1 and that a further priority level mismatch is obtained for this second stage, then the interrupt request would be shifted or transferred to the third shift register stage SR 2 where the same comparison step would be repeated using another and one count lower mask register priority level value. This shifting of the interrupt request from one shift register stage to the next continues until a positive compare result is obtained in a particular shift register stage. In that event, the interrupt request would thereafter be processed in that part or branch of the interrupt unit for which the priority level agrees with that of the interrupt request.

In this manner it is insured that the interrupt requests are handled in accordance with their priority level values. The interrupt request is further processed in that part or branch in which a match with the shift register comparator mask register is established. In particular, as represented by process block 54, the source identifying priority sublevel field is transferred to the FIFO storage stack in the corresponding interrupt unit branch.

Decision block 55 represents the stack status test performed by the test mechanism (comparator and mask register) connected to the output of the associated FIFO storage stack. This test determines whether there are any valid and unprocessed interrupt request source identifying sublevel entries in the associated FIFO stack. If the test represented by decision block 55 determines that the associated FIFO stack contains one or more pending interrupt request entries, then the "yes" branch is taken and the first received of these entries is further processed by checking in decision block 57 whether the associated priority level is blocked by the pendancy of a higher priority level entry in a higher priority level FIFO storage stack. If, on the other hand, the stack status test mechanism decision block 55 determines that there are no pending interrupt request entries in the associated FIFO stack, then the "no" branch is taken and a test loop 56 is entered which serves to monitor the situation and to determine when an interrupt request entry is stored into the associated FIFO stack.

If decision block 57 determines that there is no blockage as a result of a pending interrupt request of a higher priority level, then the interrupt request entry obtained from the FIFO stack being considered will proceed toward execution. A blockage caused by any interrupt request of a higher priority level, on the other hand, will cause further processing of the given interrupt request to be postponed until all interrupt requests of higher priority level have been processed. This waiting loop is indicated at block 58 in FIG. 2. Decision block 57 and waiting loop 58 are not used for the branch portion of the interrupt unit in which is located the stack storage FIFO 0 for the highest priority level because there is no higher level to block same.

Decision block 59 represents a test to determine whether a previous interrupt request of the same priority level is still in the process of being executed. If the execution of the interrupt routine for the previous request has already been completed, then the "yes" branch is taken to the process block 61. One item indicated by the process block 61 is that the new interrupt request entry now appearing at the output of the storage stack (e.g., FIFO 0) is set into its instruction address register (e.g., IAR 0) and combined therein with the base address from the associated base address register (e.g., BREG 0) to form the address pointer for the first instruction of the associated interrupt routine. This address pointer is then transferred to the data processor control store addressing mechanism to start the desired interrupt routine.

A further item indicated by the decision block 61 is the blocking of transfers to lower priority level instruction address registers. Thus, if the transfer being considered is to the highest priority level instruction address register IAR 0, then the transfers of data to the lower priority level instruction address registers IAR 1, . . . IAR n are blocked or inhibited. Similarly, if a transfer to the second highest instruction address register IAR 1 is being considered, then transfers to the lower level instruction address registers IAR 2, IAR 3, etc., are blocked.

If decision block 59 determines, on the other hand, that the preceding interrupt routine of the same priority level has not yet been fully executed, then the "no" branch is taken and a waiting loop represented by block 60 is entered. The waiting action of block 60 is continued until it is determined that the previous routine of the same priority level has been fully executed and that no higher priority level blockages have occurred in the interim. Upon occurrence of such a determination, the waiting loop 60 is terminated and the new interrupt request entry is set into its instruction address register in accordance with block 61.

Referring now to FIG. 3, there is shown in greater detail the construction of a priority interrupt unit constructed in accordance with FIG. 1 but limited, for the sake of example, to the case of a unit which can handle four different priority levels. These will be identified as priority levels 0, 1, 2 and 3, with level 0 being the highest priority level. Typical interrupt sources are indicated by elements 1-4. Each one byte (8 bit) interrupt request which is produced by one of these sources contains a two-bit priority level field LV and a four-bit source identifying sublevel field SLVL. The LV field is located in bit positions 0 and 1 and the SLVL field is located in bit positions 2-5. Bit position 6 is used as a control bit (IB) and bit position 7 is not used in the present example. The bit 6 control bit is set to one when the associated interrupt source issues on interrupt request to the priority interrupt unit which comprises the remainder of FIG. 3.

Sources 1-4 are periodically interrogated in a sequential manner. If, for any given interrogation of any given source, the control bit 6 of such source contains a binary one and the interrupt register 6 is empty, then the interrupt request being presented by such source at such moment is transferred to the interrupt register 6 by way of source output gate circuits and 8-bit bus 5. Bit position 6 in the interrupt register 6 is used as a status bit to indicate whether such register is empty (free) or not empty (not free to receive a new request). A binary 1 value indicates the empty case and a binary 0 value indicates the not empty case. Thus, if the source bit position 6 of the interrogated source has a value of 1 and the interrupt register bit position 6 has a value of 1, the interrupt request of such source is transferred to the interrupt register 6.

The transfer of interrupt requests from sources 1-4 to the interrupt register 6 is controlled by gate control pulses T0-T3, respectively, which control the output gates associated with respective ones of the sources 1-4. FIG. 4 shows the graphic symbolism used to denote the output gate circuits for the various elements in FIG. 3, such elements including the sources 1-4 as well as the various registers and other elements of the interrupt unit. The symbolism used in FIG. 3 is shown on the right hand side of FIG. 4. The output gate circuits are represented by a line which is pointed at by a T symbol. This is equivalent to what is shown on the left hand side of FIG. 4. The T line corresponds to the AND block shown on the left hand side and, as such, represents a set of AND gates. T denotes the gate control pulse which enables the AND gates to pass the data to the AND gate output bus.

The various gate control pulses T0 through T10 shown in FIG. 3 for use in explaining a typical operation of the FIG. 3 interrupt unit are generated by the gate control signal generator shown in FIG. 5. This gate control signal generator, as well as the timing pulses shown in FIG. 6 and used in conjunction therewith, will be discussed hereinafter.

The table of FIG. 7 indicates the significance of various control signals (X1, X2, etc.) which are developed by the different elements of the FIG. 3 interrupt unit. These control signals are supplied to the FIG. 5 signal generator to control the generation of the various gate control pulses (T0, T1, etc.). The first column of the FIG. 7 table lists the different types of hardware elements, the second column lists their status conditions, the third column lists the control signal codes used to identify these status conditions and the fourth or rightmost column lists the element bit positions which determine these control signal codes. As seen from the first line (INT-REG line) of the table, the interrupt register (INT-REG) 6 can be either empty, which is denoted by E in the status column, or not empty, which is denoted by NE in the status column. The code column shows the coding chosen for this purpose, namely, X1 for empty and $\overline{X1}$ for not empty. The reference bit provided for this purpose is bit 6 in the interrupt register. Thus, this bit 6 position contains a binary 1 for the empty (E) status and a binary 0 for the not empty (NE)

status. A binary 1 in bit position 6 produces an X1 control signal (X1=1) and a binary 0 produces an $\overline{X1}$ control signal ($\overline{X1}$=1). The $\overline{X1}$ signal is always the inverse of the X1 signal. If X1=1, then $\overline{X1}$=0 and vice versa. The $\overline{X1}$ signal is obtained by using a NOT circuit to invert the value in bit position 6.

A similar coding is provided for each of the shift register stages SR 0 through SR 3, this being represented by the second or SR line of the FIG. 7 table. In particular, a shift register stage bit 6 value of 1 denotes the empty (E) condition and produces an X2 control signal, while a bit 6 value of 0 denotes a not empty (NE) condition and produces a $\overline{X2}$ control signal.

For each FIFO signal stack, four possible conditions have to be taken into account. Two of these are indicated by the third line (first FIFO line) of the FIG. 7 table and correspond to the conditions as to whether the stack is full (F) or whether the stack is not full (NF). These two conditions determine whether to allow the transfer of an interrupt request from a shift register stage to its associated storage stack. The asterisk in the last column of line 3 denotes that the control bit used for this purpose is bit 6 of the most recent interrupt request item stored into the storage stack (the "top" item in the stack). As indicated in FIG. 3 for the FIFO 0 stack, for example, a one byte (8 bit) storage location is provided for each interrupt request item received from the shift register stage. The source identifying sublevel field received from the shift register stage is set into bit positions 2-5 of such one byte storage location. Bit position 6 is then used as a control bit. This bit 6 position of the newest entry in the stack is set to one if the newest entry causes the stack to become completely full (X3 condition) and is set to zero if the newest entry does not fill the stack ($\overline{X3}$ condition).

The other pair of conditions for each FIFO stack is represented by the fourth line (second FIFO line) of the FIG. 7 table. In this case, the conditions to be determined are stack empty (E) and stack not empty (NE). As indicated by the double asterisk in the last column of this line 4, the bit 6 control bit of the oldest entry in the stack is used for such purpose. Such bit 6 is set to one (X4 or empty condition) when a transfer of a stack entry to the instruction address register causes the stack to become empty. Otherwise, bit 6 of the bottom byte in the stack is a zero ($\overline{X4}$ condition) to indicate that the stack is not empty. These X4/$\overline{X4}$ conditions are used to control the transfer of the bottom entry (oldest item) in the stack to the instruction address register, with no transfer being allowed if the stack is empty. As indicated in FIG. 3, these X4/$\overline{X4}$ control signals are developed by the stack status comparator circuit coupled to the output of the storage stack. For example, the comparator circuit COMP 01 is connected to the bit 6 output of stack FIFO 0. If there is a 0 in the bit 6 position of the bottom byte of the FIFO 0 stack to match the 0 in the mask register MR 01, then the $\overline{X40}$ comparator output line is set to 1 and the X40 output line is set to 0 to denote the existence of the stack not empty (NE) condition. The X40 and $\overline{X40}$ lines are always operated in unison so that the $\overline{X40}$ value is always the one's complement of the X40 value. The second digit, for example, the 0 in X40, denotes the priority level of the particular X4 signal being considered.

Another condition that is taken into account is the empty versus not empty status of the instruction address registers. This is indicated by the fifth or IAR line of the FIG. 7 table. For this purpose, the most significant bit position (bit 0) in each instruction address register (IAR) is used as the reference or control bit. This bit 0 position is set to one if the instruction address register is empty (X5 condition) and is set to zero if the instruction address register is not empty ($\overline{X5}$ condition). A storage stack interrupt request entry will not be transferred to the associated instruction address register if the IAR is not empty. By "empty" is meant that the register is free to receive a new entry or, in other words, that the previous entry has been processed and is no longer valid even though it may still physically reside in the register.

A further condition that is taken into account before a FIFO stack entry is transferred to its associated instruction address register is whether any unprocessed interrupt request entries are pending in any higher priority level FIFO stacks. The determination of this condition is represented by the sixth or LVL line of the FIG. 7 table. For any given instruction address register, a priority level blocked (B) condition is indicated by the occurrence of an X6=1 control signal and the occurrence of a priority level not blocked (NB) condition is indicated by the occurrence of an $\overline{X6}$=1 control signal.

The last or COMP line of the FIG. 7 table indicates the condition considerations used for each of the priority level testing comparator circuits which are connected to the different shift register stages, for example, the comparator circuit COMP 00 connected to the shift register stage SR 0. If one of these comparator circuits (e.g., COMP 00) detects a match, this is designated as an equal (EQ) condition and the appropriate X7 control signal (e.g., X70) is set to one. If, instead, a mismatch is detected, this is designated as a not equal (NEQ) condition and the appropriate $\overline{X7}$ control signal (e.g., $\overline{X70}$ is instead set to one. X7 and $\overline{X7}$ are always maintained in the one's complement relationship so that only one of them can be at the one level at any given instant. The X7 and $\overline{X7}$ values are adjusted, if necessary, during the testing of shift register stage bit positions 0 and 1 and FIFO stack top byte bit position 6.

As mentioned, the gate control pulses T0, T1, T2, etc. employed in the interrupt unit of FIG. 3, are produced by the gate control signal generator shown in FIG. 5. This FIG. 5 signal generator includes a main clock generator 70 for generating a main clock signal having a waveform represented by the MCL waveform of FIG. 6 and a subclock generator 71 for generating subclock pulses are represented by the SCL waveform of FIG. 6. These clocking signals are supplied to a series of AND circuits 72-82 in the manner depicted in FIG. 5. Also supplied to different ones of the AND circuits 72-82 are different ones of the control signals X1/$\overline{X1}$ through X7/$\overline{X7}$ which are developed by and obtained from the various FIG. 3 circuits in the manner described in connection with the FIG. 7 table and partially shown in FIG. 3. In both FIG. 3 and FIG. 5, these X control signals, for example, X7, are distinguished between as X70, X71, X72 and X73, this distinction indicating the particular priority level circuit by which this signal is generated. In other words, X70 denotes the comparator output signal for the highest priority level (level 0), the X71 signal denotes the comparator output signal for the second highest priority level (level 1), the X72 signal represents the comparator output signal for the third highest priority level (level 2), and so forth.

In response to the various combinations of X control signals and the different clock pulses as shown in FIG. 5, the AND circuits 72-82 generate the various gate control pulses T0-T10. These gate control pulses T0–T10 are supplied to the output gate circuits associated with the different hardware elements shown in FIG. 3 to produce the desired data transfer actions. At this point, it should be noted that FIG. 5 shows only part of the complete gate control signal generator which is needed to produce all of the gate control pulses required by FIG. 3. In particular, FIG. 5 shows only the part that is needed to produce the typical sequence of detailed operations which will now be considered as an example of how the FIG. 3 unit works. The additional gate control pulses which are not shown in FIG. 5 are generated in an analogous manner using the same technique as shown in FIG. 5.

Considering now in detail a more or less typical sequence of operations for the FIG. 3 interrupt unit, the priority level field codes are assumed to be as follows:

| Priority Level | LV Code |
|---|---|
| 0 | 00 |
| 1 | 01 |
| 2 | 10 |
| 3 | 11 |

Level 0 is the highest priority level and level 3 is the lowest priority level.

Level 0 interrupt requests are processed by the column of circuits located below the first shift register stage SR 0 (element 8), level 1 interrupt requests are processed by the column of circuits located below the second shift register stage Sr 1 (element 9), level 2 interrupt requests are processed by the column of circuits (not shown) located below the third shift register stage SR 2 (not shown) and level 3 interrupt requests are processed by the column of circuits (partially shown) located below the fourth shift register stage SR 3 (element 10).

Assume now that one of the interrupt sources, for example, the interrupt source INT-S0 is presenting a valid interrupt request having a coding of "01100110" and that the interrupt register 6 is empty. The 01 coding of the first two bits indicates that this is a priority level 1 interrupt request. This interrupt request is transferred to the interrupt register 6 by means of the T0 gate control pulse when it is applied to the output gates of interrupt source INT-S0.

If the first shift register state SR 0 is empty (X20=1), then the T4 gate control pulse is generated to transfer the interrupt request from the interrupt register 6 to the first shift register stage SR 0. At this point, a determination is made as to the full versus not full condition of the priority level 0 storage stack FIFO 0 (element 15) and the bit 6 position in shift register stage SR 0 is set to 1 if the stack is full and is set to 0 if the stack is not full. Bit positions 0, 1 and 6 in the shift register stage SR 0 are then compared at the occurrence of gate control pulse T5 with the 3 bits in the mask register MR 00 (element 14) by the comparator circuit COMP 00 (element 11). These shift register bits are supplied to COMP 00 via bus 13. The first two bits on the left in mask register MR 00 denote the priority level value, in this case, the 00 value assigned to the shift register stage SR 0 and the third or right hand bit contains a 0 bit corresponding to the stack not full condition. In this case, since the interrupt request has a priority level code of 01 and not 00, the $\overline{X70}$ output line of comparator 00 goes to one and the X70 line goes to zero.

Assuming that the next shift register stage SR 1 is empty (X21=1), then upon occurrence of the appropriate clock pulse, the T6 gate control pulse is generated. This causes a transfer of the interrupt request in the first shift register stage SR 0 to the second shift register stage SR 1. Also, bit 6 in the first shift register stage SR 0 is set to a one value to indicate that this first stage is now empty. Bit 6 in the second shift register stage SR 1 is set to zero if the priority level 1 storage stack FIFO 1 is not full ($\overline{X31}=1$), which is assumed to be the case.

The gate control pulse T7 then initiates via bus 33 the priority level 1 comparison test by the level 1 comparator COMP 10 (element 31). In this case, the comparison with the mask in the level 1 mask register MR 10 (element 34) yields a positive result or a match. Consequently, the comparator output line X71 goes to one and the $\overline{X71}$ output line goes to zero. This enables generation of the T8 gate control pulse to cause a transfer of bits 2–6 from the shift register stage SR 1 to the level 1 storage stack FIFO 1 (element 35) via bus 32. Bits 2–5 are the source identifying sublevel field which, in this example, has a code value of 1001. This interrupt request entry, in effect, drops to the bottom location of byte position in the FIFO 1 stack, such stack being assumed to be previously completely empty. The zero value in the bit 6 position of this entry is allowed to remain to provide an indication that the stack is not empty.

The stack status test mechanism comparator COMP 11 (element 36) examines via line 38 the bit 6 position of the bottom or stack output byte and, since a match is in this case produced with the zero in mask register MR 11 (element 39), the $\overline{X41}$ comparator output line is set to one to indicate the "stack not empty" condition.

Assuming that the priority level 1 instruction address register IAR 1 is empty (X51=1), then the next t1 sub-clock pulse generates the T9 gate control pulse. This T9 pulse transfers via bus 27 the source identifying sublevel field (bits 2–5) from the bottom byte location of the FIFO 1 stack and sets it into bit positions 12–15 in IAR 1 (element 42). This T9 pulse also transfers via bus 41 the priority level 1 base address from the base address register B-REG 1 (element 40) and sets such plural-bit base address into bit positions 0–11 in IAR 1. Also, bit position 0 in IAR 1, which is used as a control bit, is set to 0 to indicate that IAR 1 is now not empty ($\overline{X51}$ condition). The combination of the base address bits and the source identifying sublevel bits in the instruction address register IAR 1 forms the desired control store address pointer for the interrupt source INT-S0.

Assuming that this priority level 1 address pointer is not being blocked by the pendency of an interrupt request entry in a higher priority level storage stack, in this example by the pendency of a priority level 0 interrupt request entry in the level 0 stack FIFO 0, then the not blocked signal $\overline{X61}=1$ is provided for the priority level 1 instruction address register IAR 1. More particularly, as indicated in FIG. 5, this $\overline{X61}=1$ signal enables generation of the T10 gate control pulse. This T10 pulse causes a transfer of the interrupt routine address pointer in IAR 1 to the addressing mechanism (not shown) of the data processor control store (not shown). This causes the control store to branch to the first instruction of the microcode interrupt routine for interrupt source INT-S0 and to commence executing this interrupt routine.

FIG. 8 is a timing diagram which illustrates how the priority interrupt unit of FIG. 3 can service several interrupt requests in a parallel manner, provided that they are associated with different interrupt priority levels. The top line of FIG. 8 represents the operational sequence for a first interrupt request of a given priority level, namely, a level 1 request. The middle line of FIG. 8 represents the operational sequence for a second interrupt request of a higher priority level, namely, a level 0 request. The bottom line of FIG. 8 represents the initial portion of the operational sequence for a third interrupt request. In FIG. 8, the general designations given in FIG. 7 are used for the X control signals. For example, in the case of a positive compare result in a comparator connected to a shift register stage, the general designation X7 is used irrespective of whether the comparator in question belongs to the shift register stage SR 0, SR 1, SR 2, or SR 3.

While there has been described what is at present considered to be a preferred embodiment of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A priority interrupt unit for use in a data processing system having different stored interrupt routines for different interrupt sources and comprising:
    input circuitry for successively supplying plural-bit interrupt requests each having a priority level field and an interrupt source identifying field;
    a plural stage shift register, each stage having enough bit positions to hold at least the priority level and source identifying fields of a single interrupt request and successive stages being assigned to successively lower priority levels, the highest priority level stage being coupled to the input circuitry for initially receiving each incoming interrupt request;
    a plurality of interrupt mechanisms individually associated with different ones of the shift register stages and responsive to interrupt source identifying fields transferred to such mechanisms for developing appropriate interrupt routine address pointers for the data processing system;
    and transfer circuitry responsive to the contents of the shift register stages for transferring an interrupt request in any given shift register stage to the next shift register stage if the request priority level field does not match the priority level assigned to the given shift register stage and for transferring the interrupt source identifying field of such interrupt request to the interrupt mechanism associated with the given shift register stage if the request priority level field does match the priority level assigned to the given stage.

2. A priority interrupt unit in accordance with claim 1 wherein each interrupt mechanism includes:
    a storage stack for receiving and storing the interrupt source identifying fields of those interrupt requests having the same priority level as the shift register stage with which the interrupt mechanism is associated;
    interrupt routine address circuitry for receiving an interrupt source identifying field and developing in response thereto the appropriate interrupt routine address pointer;
    and circuitry response to the presence of interrupt source identifying fields in the storage stack for transferring one interrupt source identifying field at a time from the storage stack to the interrupt routine address circuitry and for transferring such source identifying fields to the address circuitry in the same order in which they are received by the storage stack.

3. A priority level controlled unit for handling interrupt requests of interrupt sources having different interrupt priority levels comprising:
    input circuitry for supplying interrupt requests each having a priority level field and a priority sublevel field;
    a shift register whose stages are assigned to different ones of the interrupt priority levels, the first stage in such shift register being coupled to the input circuitry for initially receiving each incoming interrupt request;
    a comparator mechanism associated with each shift register stage for comparing the priority level field of an interrupt request residing in such stage with the priority level value assigned to such stage for indicating the existence of priority level matches and mismatches;
    a transfer mechanism for transferring an interrupt request in any given shift register stage to the next shift register stage when the comparator mechanism associated with the given stage indicates a priority level mismatch;
    a storage stack associated with each shift register stage for storing the priority sublevel field contained in an interrupt request in its shift register stage when the comparator mechanism associated with its shift register stage indicates a priority level match;
    a base address register associated with each shift register stage for storing a base address initially loaded into such register by the data processing system with which the priority unit is used;
    and instruction address circuitry associated with each shift register stage for combining the base address with the earliest received unprocessed priority sublevel field then pending in the associated storage stack to form an instruction address pointer for the first instruction of an interrupt routine for executing the interrupt request of the corresponding interrupt source.

4. A priority level controlled unit in accordance with claim 3 wherein each comparator mechanism also includes circuitry responsive to the condition of the storage stack associated with its shift register stage for determining whether such storage stack is full and for preventing transfer of a further priority sublevel field to such storage stack if it is full.

5. A priority level controlled unit in accordance with claim 3 wherein each comparator mechanism includes a comparator circuit and a mask register containing a coded representation of the associated interrupt priority level, the comparator circuit being connected on the one hand to the priority level field portion of the associated shift register stage and on the other hand to the mask register for comparing their contents and generating the appropriate one of the match and mismatch indications.

6. A priority level controlled unit in accordance with claim 3 wherein a test mechanism is associated with each storage stack for testing the stack status for determining whether any unprocessed priority sublevel fields are pending therein and for enabling transfer of the oldest such priority sublevel field to the instruction address circuitry when the result of the testing is positive.

7. A priority level controlled unit in accordance with claim 6 wherein each test mechanism includes a comparator circuit and a mask register containing a coded representation for the case where the storage stack is not empty, the comparator circuit being connected on the one hand to the output stage of the storage stack and on the other hand to the mask register for comparing their status and generating a transfer enabling signal when the storage stack is not empty.

8. A priority level controlled unit in accordance with claim 3 and including:
- a first gating mechanism for transferring a priority sublevel field from a shift register stage to its associated storage stack if the associated comparator mechanism has determined that the priority level of the interrupt request and that of the shift register stage match and that the storage stack is not full;
- a second gating mechanism for transferring the priority sublevel field contained in the current output of a storage stack to the associated instruction address circuitry if the storage stack is not empty;
- a third gating mechanism for transferring the base address stored in a base address register to the associated instruction address circuitry if a priority sublevel field is also transferred to the same instruction address circuitry;
- a fourth gating mechanism for transferring an interrupt request stored in any given shift register stage to the shift register stage associated with the next lower interrupt priority level if the comparator mechanism associated with the given shift register stage indicates a priority level mismatch and such next shift register stage is not occupied by another interrupt request;
- and a fifth gating mechanism for transferring an instruction address pointer pending in an instruction address circuitry to a data processor control store storing the various interrupt routines if no blockage of such transfer is caused by the presence of a pending instruction address pointer in an instruction address circuitry for a higher interrupt priority level.

9. A method for handling interrupt requests of interrupt sources having different interrupt priority levels comprising:
- transferring one interrupt request at a time to a first register, each such request being transferred thereto only if the first register is free of the previous request transferred thereto;
- determining whether an interrupt request pending in the first register is of a first priority level;
- transferring an interrupt request pending in the first register to a first interrupt mechanism if such request is of the first priority level and if the first interrupt mechanism is not full;
- enabling the first interrupt mechanism to initiate execution of an appropriate interrupt routine if an interrupt request is pending therein;
- transferring an interrupt request pending in the first register to a second register if such request is not of the first priority level and if the second register is free;
- determining whether an interrupt request pending in the second register is of a second priority level;
- transferring an interrupt request pending in the second register to a second interrupt mechanism if such request is of the second priority level and if the second interrupt mechanism is not full;
- enabling the second interrupt mechanism to initiate execution of an appropriate interrupt routine if an interrupt request is pending therein and no interrupt request is pending in the first interrupt mechanism;
- transferring an interrupt request pending in the second register to a third register if such request is not of the second priority level and if the third register is free;
- transferring an interrupt request pending in the third register to a third interrupt mechanism if the third interrupt mechanism is not full;
- and enabling the third interrupt mechanism to initiate execution of an appropriate interrupt routine if an interrupt request is pending therein and no interrupt request is pending in either the first or the second interrupt mechanism.

10. A method for handling interrupt requests in accordance with claim 9 wherein:
- each of the first, second and third interrupt mechanisms includes a storage stack for storing a number of interrupt requests;
- the interrupt requests transferred to any given interrupt mechanism are stored in its storage stack in the same order in which they are received;
- and each interrupt mechanism is operated to initiate execution of the interrupt routines for the different interrupt requests in the same order in which such requests were transferred to its storage stack so that the interrupt requests in any given storage stack are honored in a first-in-first-out manner.

* * * * *